(12) United States Patent
Chivite Zabalza et al.

(10) Patent No.: US 12,445,046 B2
(45) Date of Patent: Oct. 14, 2025

(54) CIRCUITRY AND METHODS FOR DETECTING AN ELECTRICAL FAULT IN POWER CONVERSION CIRCUITRY

(71) Applicant: ROLLS-ROYCE plc, London (GB)

(72) Inventors: Francisco Javier Chivite Zabalza, Stafford (GB); David R Trainer, Derby (GB); Mark Sweet, Chesterfield (GB); Matthew C Morris, Glasgow (GB)

(73) Assignee: ROLLS-ROYCE plc, London (GB)

( * ) Notice: Subject to any disclaimer, the term of this patent is extended or adjusted under 35 U.S.C. 154(b) by 322 days.

(21) Appl. No.: 18/323,884

(22) Filed: May 25, 2023

(65) Prior Publication Data

US 2023/0421053 A1 Dec. 28, 2023

(30) Foreign Application Priority Data

Jun. 23, 2022 (GB) ...................................... 2209219

(51) Int. Cl.
*H02M 1/32* (2007.01)
*H02M 3/155* (2006.01)

(52) U.S. Cl.
CPC ............. *H02M 1/32* (2013.01); *H02M 3/155* (2013.01)

(58) Field of Classification Search
CPC .................................. H02M 1/32; H02M 3/155
See application file for complete search history.

(56) References Cited

U.S. PATENT DOCUMENTS

| | | | | |
|---|---|---|---|---|
| 9,188,620 B1 * | 11/2015 | Wagner | ................ | G01R 31/086 |
| 9,712,055 B1 * | 7/2017 | Swartz | ................. | H02M 3/158 |
| 9,800,129 B2 * | 10/2017 | Ortiz | ................. | H02M 3/33523 |
| 9,831,798 B2 * | 11/2017 | Toujinbara | .............. | H02J 3/381 |
| 2004/0240240 A1 | 12/2004 | Bijlenga et al. | | |
| 2008/0285192 A1 | 11/2008 | Phadke et al. | | |

(Continued)

FOREIGN PATENT DOCUMENTS

| | | |
|---|---|---|
| CN | 112260572 A | 1/2021 |
| DE | 10 2019 207 968 A1 | 12/2020 |

(Continued)

OTHER PUBLICATIONS

Nov. 29, 2022 Search Report issued in British Patent Application No. GB2209219.1.

(Continued)

*Primary Examiner* — Rafael O De Leon Domenech
(74) *Attorney, Agent, or Firm* — Oliff PLC (57) ABSTRACT

A power conversion circuitry configured to detect an electrical fault, and methods of detecting an electrical fault in power conversion circuitry, the power conversion circuitry including: switching circuitry configured to control a current flowing along a current path between first and second nodes of the power conversion circuitry; a current sensor connected to the current path, the current sensor configured to measure a rate of change of the current flowing along the current path; and control circuitry connected to the current sensor and the switching circuitry, the control circuitry configured to: detect an electrical fault if a rate of change of the current measured by the current sensor exceeds a fault threshold, and configure the switching circuitry to adjust current flow in the power conversion circuitry when an electrical fault is detected.

18 Claims, 4 Drawing Sheets

(56)     References Cited

U.S. PATENT DOCUMENTS

| | | | |
|---|---|---|---|
| 2011/0234130 A1 | 9/2011 | Okumura | |
| 2012/0182771 A1 | 7/2012 | Trainer et al. | |
| 2013/0208514 A1 | 8/2013 | Trainer et al. | |
| 2016/0365787 A1 | 12/2016 | Geske et al. | |
| 2017/0276715 A1 | 9/2017 | Heinz et al. | |
| 2017/0310237 A1 | 10/2017 | Uda et al. | |
| 2018/0076734 A1 | 3/2018 | Jimichi et al. | |
| 2019/0131867 A1 | 5/2019 | Ishii | |
| 2020/0067303 A1 | 2/2020 | Uchida et al. | |
| 2020/0136370 A1 | 4/2020 | Loder et al. | |
| 2020/0412235 A1 | 12/2020 | Chivite-Zabalza et al. | |
| 2022/0181992 A1 | 6/2022 | Toshiyuki | |
| 2022/0190591 A1 | 6/2022 | Wang et al. | |

FOREIGN PATENT DOCUMENTS

| | | |
|---|---|---|
| EP | 3 258 563 A1 | 12/2017 |
| EP | 3 920 393 A1 | 12/2021 |
| JP | H07-298481 A | 11/1995 |
| WO | 2008/139283 A2 | 11/2008 |

OTHER PUBLICATIONS

Nov. 8, 2022 Search Report issued in British Patent Application No. GB2209220.9.
U.S. Appl. No. 18/323,878, filed May 25, 2023 in the name of Chivite Zabalza et al.
Oct. 26, 2023 Search Report issued in European Patent Application No. 23174709.8.
Oct. 24, 2023 Search Report issued in European Patent Application No. 23174708.0.
Aug. 20, 2025 Notice of Allowance issued in U.S. Appl. No. 18/323,878.

* cited by examiner

CIRCUITRY AND METHODS FOR DETECTING AN ELECTRICAL FAULT IN POWER CONVERSION CIRCUITRY

BACKGROUND

This specification is based upon and claims the benefit of priority from UK Patent Application Number 2209219.1 filed on 23 Jun. 2022, the entire contents of which are incorporated herein by reference.

FIELD OF THE DISCLOSURE

The present disclosure relates to circuitry and methods for detecting an electrical fault in power conversion circuitry.

BACKGROUND OF THE DISCLOSURE

Existing fault detection techniques for power conversion circuitry typically rely on desaturation of a conducting transistor. Desaturation occurs when a voltage between terminals of a conducting transistor exceeds a threshold voltage.

It will be understood that improvements in fault detection for power conversion circuitry are desirable.

SUMMARY OF THE DISCLOSURE

According to a first aspect there is provided a power conversion circuitry configured to detect an electrical fault, the power conversion circuitry comprising:
  switching circuitry configured to control a current flowing along a current path between first and second nodes of the power conversion circuitry;
  a current sensor connected to the current path, the current sensor configured to measure a rate of change of the current flowing along the current path; and
  control circuitry connected to the current sensor and the switching circuitry, the control circuitry configured to:
    detect an electrical fault if a rate of change of the current measured by the current sensor exceeds a fault threshold, and
    configure the switching circuitry to adjust current flow in the power conversion circuitry when an electrical fault is detected and wherein
  the switching circuitry is configured to control currents flowing along a plurality of current paths between respective pairs of nodes of the power conversion circuitry comprising at least the first and second nodes;
  the power conversion circuitry comprises a plurality of current sensors comprising at least the current sensor, connected to the respective current paths, each current sensor configured to measure a rate of change of the current flowing along its current path;
  the control circuitry is connected between the plurality of current sensors and the switching circuitry, the control circuitry configured to:
    detect an electrical fault if a rate of change of the current measured by one or more of the current sensors exceeds a fault threshold, and
    configure the switching circuitry to control current flow in the power conversion circuitry when an electrical fault is detected.

The power conversion circuitry provides a means for extinguishing fault current quickly and at a lower magnitude. This reduces stress on the converter and electrical system and reduces the associated transient over-voltage stress on the equipment.

The measured rate of change of current may be used to determine whether an electrical fault is internal or external to the power converter circuitry and inform a decision as to whether a re-start should be attempted.

The switching circuitry may comprise one or more transistors configured to switch on and off according to a predetermined switching pattern. Where the switching circuitry comprises plural transistors, those transistors may be configured to switch on and off at different times according to the predetermined switching pattern.

The transistors may be field effect transistors (FETs) or bipolar junction transistors (BJTs). Examples of types of transistors include: PMOS MOSFETs, NMOS, MOSFETs, N-type BJTs, P-type BJTs, insulated-gate bipolar transistors (IGBTs).

The switching circuitry may further comprise additional circuit components connected to the current path in series with or in parallel with the one or more transistors. For example, the switching circuitry may comprise one or more capacitors, inductors and/or resistors connected in parallel with the one or more transistors between two points of the current path.

An electrical fault may be any electrical fault resulting in a rate of change of current that exceeds the fault threshold (also referred to as an overcurrent event). For example, the electrical fault may be a short circuit at the output of the power conversion circuitry, or a short circuit of the power conversion circuitry itself, such as a shoot through fault within the switching circuitry.

The current path may be configured to conduct current between at least the first and second nodes of the power conversion circuitry. The current path may be, for example, an electrical cable. The first and second nodes may be different nodes or may be the same node. The current path may be a circular current path around which current flows (i.e. between the first and second nodes via any intermediary circuitry and/or components).

The current sensor may be an electrical component configured to measure current flowing along the current path (e.g. in Amperes). The rate of change of current flowing along the current path may be determined by measuring the flow of current along the current path over a predetermined duration (e.g. 2 micro seconds). The current sensor may generate a fault signal when (an increase in or a decrease in) the measured rate of change of current exceeds the fault threshold.

The control circuitry may control the switching circuitry based on the predetermined switching pattern. For example, where the switching circuitry comprises one or more transistors, the control circuitry may be configured to control the one or more transistors to turn on and off according to the predetermined switching pattern. The control circuitry may comprise transistor driver circuitry (e.g. gate driver circuitry or base driver circuitry) configured to control the one or more transistors (e.g. according to the predetermined switching pattern).

The control circuitry may receive the fault signal from the current sensor when the control circuitry determines the rate of change of current exceeds the fault threshold. An electrical fault may be detected in response to receiving the fault signal from the current sensor.

The fault threshold may be based on a maximum current rating (and the associated thermal impact) of the switching circuitry (e.g. a maximum current rating of transistors of the switching circuitry). The fault threshold may be exceeded if a measured rate of change of current increases or decreases at a rate that exceeds the fault threshold.

The control circuitry may be configured to adjust current flow in response to receiving the fault signal from the current sensor. Current flow may be adjusted by configuring the switching circuitry to create an open circuit at a certain point in the circuitry such that current flow is stopped (e.g. by opening one or more transistors of the switching circuitry).

Optionally, the current sensor may be configured to measure a magnitude of the current flowing along the current path, and the control circuitry may be configured to adjust the fault threshold based on the magnitude of current measured by the current sensor.

The magnitude of current may be a measured in Amperes at an instantaneous point in time during operation of the power conversion circuitry. The magnitude of current may be measured during normal operation where no fault is detected or the magnitude of current may be measured after a fault has been detected (i.e. under fault conditions).

The fault threshold may be increased or decreased compared to an initial fault threshold (e.g. set based on the maximum current rating for the power conversion circuitry) based on the measured magnitude of current flowing along the current path. For example, if the measured magnitude of current is below a safety rating for the power conversion circuitry, the fault threshold may be increased. Alternatively, if the measured magnitude of current is above the safety rating for the power conversion circuitry, the fault threshold may be decreased. The safety rating may be a certain percentage below the maximum current rating of the power conversion circuitry (e.g. 5%, 10%, 25%).

Therefore, the measured rate of change of current can be used in conjunction with a measurement of absolute current magnitude (e.g. the pre-fault current) to better inform the protection system to ensure an optimum fault response is achieved and false tripping is avoided.

Optionally, the switching circuitry may comprise a transistor, and the control circuitry may be configured to output a control signal for controlling operation of the transistor when an electrical fault is detected.

The control signal may be output in response to receiving the fault signal from the current sensor. The control signal may be generated by and/or output by the transistor driver circuitry (e.g. gate driver circuitry or base driver circuitry).

Optionally, the transistor may be configured to transition between a conductive state and a non-conductive state, and the control signal controls the transistor to remain in the non-conductive state when an electrical fault is detected.

The conductive state may be an "on state" in which current flows through the transistor (or plural transistors) of the switching circuitry. The non-conductive state may be an "off state" in which current cannot flow through the transistor (or plural transistors) of the switching circuitry. The control signal may control the transistor to remain in the non-conductive state by keeping the transistor fixed in the non-conductive state (e.g. using the transistor driver circuitry).

Optionally, the current sensor is connected to the current path at a position between the first node and the switching circuitry, or between the switching circuitry and the second node.

The current sensor may be electrically connected or electromagnetically connected to the current path. The current sensor may be connected to the current path in series with the first node and the switching circuitry or in series with the switching circuitry and the second node. Alternatively, the current sensor may be connected between two different points of the current path in parallel with the switching circuitry. Where the switching circuitry comprises additional electronic components, the current sensor may be connected in series with or in parallel with at least one of additional electronics components (e.g. capacitor, inductor and/or resistor).

Optionally, the first node is a voltage supply and the second node comprises first and second output terminals, and the current sensor may be connected to the current path at a position between a first or second terminal of the switching circuitry and a first or second terminal of the voltage supply, or the current sensor may be connected to the current path between the first or second terminal of the switching circuitry and the first or second output terminal.

The voltage supply may comprise first and second terminals (e.g. positive and negative supply terminals) and the output node may comprise first and second terminals (e.g. positive and negative output terminals). Current may flow along the current path between the terminals of the voltage supply and the output node. For example, current may flow along the current path between the first or second terminal of the voltage supply and the first or second terminal of the output node to form a closed circuit around which current flows.

The current sensor may be connected to the current path in series with the first node and the switching circuitry or in series with the switching circuitry and the second node. The current sensor may be connected between a first or second terminal of the voltage supply and a first or second terminal of the switching circuitry such that the current sensor is connected in series or in parallel with the switching circuitry at a position between the switching circuitry and the voltage supply. Alternatively, the current sensor may be connected between a first or second terminals of the output node and a first or second terminal of the switching circuitry such that the current sensor is connected in series or in parallel with the switching circuitry at a position between the switching circuitry and the output node.

The features described above in relation to the current sensor connected to the current path apply equally to each of the plural current sensors connected to its respective current path.

Currents may flow along the plurality of current paths between (i.e. the plurality of current paths may be connected between) a first or second terminal of the voltage supply and a first or second terminal of the switching circuitry. Alternatively, currents may flow along the plurality of current paths between (i.e. the plurality of current paths may be connected between) a first or second terminal of the output node and a first or second terminal of the switching circuitry.

Optionally, the plurality of current sensors may comprise first and second current sensors connected to respective first and second current paths, wherein the first current sensor may be connected to the respective current path at a position between the switching circuitry and the first node, the second current sensor may be connected to the respective current path at a position between the switching circuitry and the second node, and the control circuitry may be connected to the first current sensor, the second current sensor and the switching circuitry.

Optionally, where the switching circuitry may be configured to control currents flowing along a plurality of current paths between respective pairs of nodes, the first node is a voltage supply and the second node comprises first and second output terminals, and the first current sensor is connected to the respective current path at a position between a first or second terminal of the switching circuitry and a first or second terminal of the voltage supply, or the current sensor is connected to the current path between the first or second terminal of the switching circuitry and the first or second output terminal.

Optionally, the control circuitry is configured to determine a location of an electrical fault based on a first rate of change of current measured by the first current sensor and/or a second rate of change of current measured by the second current sensor.

The location of an electrical fault may be determined to be at a specific location of the power conversion circuitry according to the rate of change of current measured by the first current sensor and/or the second rate of change of current measured by the second current sensor. For example, the location of an electrical fault may be determined to be between the first node and the switching circuitry or between the switching circuitry and the second node.

If the first rate of change of current measured by the first current sensor exceeds the fault threshold and the second rate of change of current measured by the second current sensor does not exceed the fault threshold, the location of an electrical fault may be determined to be between the first node and the switching circuitry (e.g. a shoot through fault).

If the first rate of change of current measured by the first current sensor does not exceed the fault threshold and the second rate of change of current measured by the second current sensor does exceed the fault threshold, the location of an electrical fault may be determined to be between the second node and the switching circuitry (e.g. a fault in an external network to which the power conversion circuitry is connected).

Optionally, the control circuitry may configure the switching circuitry to control the current flowing along the current path when an electrical fault is not detected by configuring the transistor to switch between the conductive state and the non-conductive state at a first transition rate, and the control circuitry may configure the switching circuitry to adjust current flow in the power conversion circuitry when an electrical fault is detected by configuring the transistor to switch from the conductive state to the non-conductive state at a second transition rate, the second transition rate being less than the first transition rate.

The power conversion circuitry may measure an increase in rate of change of current to detect an electrical fault at a low fault current as well as implement a soft transistor turn-off to reduce the switching overvoltage further (i.e. by switching a transistor at a the second transition rate).

That is, when no electrical fault is detected, the power conversion circuitry may be configured to continue normal operation (e.g. AC to DC conversion, DC to AC conversion or DC to DC conversion with no fault condition) by switching one or more transistors according to the predetermined switching pattern. During normal operation, the transistors may be switched on and off (i.e. between the conducting state and the non-conducting state) at the first transition rate.

When an electrical fault is detected, the control circuitry may be configured to turn one or more transistors off (i.e. into the non-conducting state), such that current flow is stopped, at the second transition rate such that the transistor is gradually turned off (i.e. into the non-conducting state).

Optionally, the transistor may comprise a control terminal, and the control circuitry may configure the switching circuitry to switch the transistor from the conductive state to the non-conductive state at the second transition rate by connecting the control terminal to a source node via an impedance.

The control terminal may be a gate terminal or a base terminal. The impedance may be a resistor, or an internal impedance of a transistor.

Optionally, the control circuitry may be configured to detect an electrical fault if a rate of change of the current measured by the current sensor exceeds the fault threshold for a predetermined time duration.

Optionally, the predetermined time duration is a commutation period.

The predetermined time duration may be a portion of a predetermined switching pattern cycle (i.e. the commutation period). The predetermined switching pattern may be a pulse width modulation (PWM) pattern according to which the one or more transistors are switched for a PWM period comprising plural PWM cycles. The predetermined time duration may be a portion of a PWM cycle.

That is, the measured rate of change may be linked to a PWM frequency of the converter such that a high increase in rate of change of current for a period greater than the PWM cycle time of the power conversion circuitry operating frequency (e.g. 20 kilo Hertz/50 micro seconds) can indicate a fault condition.

Optionally, the control circuitry may be configured to detect an electrical fault if a rate of change of the current measured by the current sensor exceeds a first fault threshold for a first time duration, and/or a rate of change of the current measured by the current sensor exceeds a second fault threshold for a second time duration, the second time duration being greater than the first time duration and the second fault threshold being less than the first fault threshold.

Optionally, the power conversion circuitry may be an H-bridge circuit.

That is, the power conversion circuitry may be a H-bridge circuit comprising two or six pairs of transistors connected between the first and second nodes as two or three circuit legs.

Optionally, the switching circuitry may be a bidirectional alternating current AC to direct DC converter or a DC to DC converter.

That is, the power conversion circuitry may be AC to DC converter circuitry, DC to AC converter circuitry or DC to DC converter circuitry. The power conversion circuitry may be bidirectional AC to DC circuitry whereby the power conversion circuitry may be configured to convert AC current to DC current and/or convert DC current to AC current.

The bidirectional AC to DC converter or the DC to DC converter may be implemented as a H-bridge circuit.

According to a second aspect there is provided a method of detecting an electrical fault in power conversion circuitry, the method comprising: controlling a current flowing along a current path between first and second nodes of the power conversion circuitry; measuring a rate of change of the current flowing along the current path; detecting an electrical fault if a rate of change of the current exceeds a fault threshold; and adjusting current flow in the power conversion circuitry when an electrical fault is detected.

According to a third aspect, there is provided a computer-readable medium comprising instructions which, when executed on a computer of power conversion circuitry, cause the computer to perform the method of the second aspect.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF THE DISCLOSURE

Aspects and embodiments of the present disclosure will now be discussed with reference to the accompanying figures. Further aspects and embodiments will be apparent to those skilled in the art.

Figure 1:
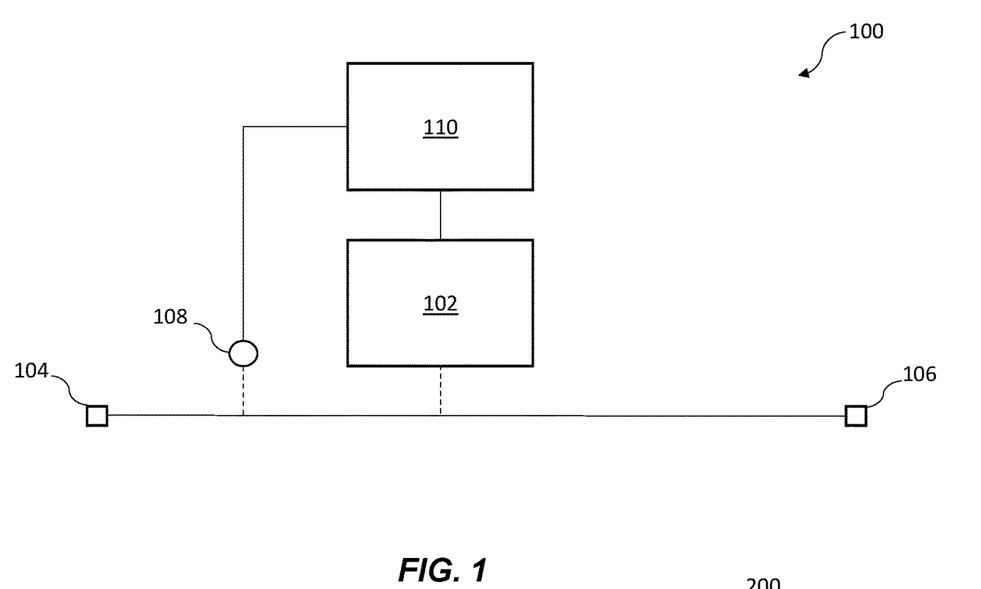
FIG. 1 is a schematic diagram of power conversion circuitry.

FIG. 1

Exemplary power conversion circuitry 100 configured to detect an electrical fault is shown in FIG. 1.

The power conversion circuitry 100 may detect the presence of an electrical fault located within the power conversion circuitry 100 and/or within a network (not shown) connected to the power conversion circuitry 100. A fault may be, for example, a short circuit resulting in a rapid rise in current flowing along a current path of the power conversion circuitry 100.

Referring to FIG. 1, the power conversion circuitry 100 comprises switching circuitry 102 configured to control current flowing along a current path (e.g. an electrical cable) between first and second nodes 104, 106 of the power conversion circuitry 100. A current sensor 108 is connected to the current path. Control circuitry 110 is connected to the switching circuitry 102 and the current sensor 108.

The switching circuitry 102 may be connected directly to the current path or may be indirectly connected to the current path via intermediate electronic components and/or circuitry (e.g. capacitors, resistors and/or inductors). Current may be controlled by the switching circuitry 102 to perform DC to DC conversion, AC to DC conversion, DC to AC conversion, or bidirectional AC to DC conversion.

The current sensor 108 is configured to measure a rate of change of current flowing along the current path. The rate of change of current may be measured as the current flows through the current sensor 108, in which case the current sensor 108 may be electrically connected to the current path. Alternatively, the rate of change of current may be measured electromagnetically without electrically connecting the current sensor 108 to the current path.

The current sensor 108 may be connected at a plurality of points along the current path between the first and second nodes 104, 106. For example, the current sensor 108 may be connected to the current path at a position between the first node 104 and the switching circuitry 102, or at a position between the second node 106 and the switching circuitry 102. In examples where the power conversion circuitry 100 includes intermediate electronic components between the switching circuitry 102 and the first and second nodes 104, 106, the current sensor 108 may be connected between one or more additional components and the switching circuitry. FIG. 1 illustrates one example of where the current sensor may be connected to the current path. The dashed lines between the example current sensors and the current path illustrate that the current sensor 108 may be electrically connected to the current path or the current sensor 108 may be electromechanically coupled to the current path.

The current sensor 108 may be configured to also measure a magnitude of the current flowing along the current path. For example, the magnitude of current may be measured in Amperes at an instantaneous point in time during operation of the power conversion circuitry. The magnitude of current may be measured during normal operation (i.e. during AC-DC, DC-AC or DC-DC conversion without an electrical fault) where no fault is detected or the magnitude of current may be measured after a fault has been detected (i.e. under fault conditions).

It will be understood that the power conversion circuitry 100 may comprise plural current sensors each having at least the same functionality as the above discussed current sensor 108.

In examples where the power conversion circuitry 100 comprises plural current sensors, first and second current sensors may be connected to the current path, such that the first current sensor may be connected at a position between the switching circuitry 102 and the first node 104, and the second current sensor may be connected to the current path at a position between the switching circuitry 102 and the second node 106. The control circuitry 110 may be connected to the first current sensor, the second current sensor and the switching circuitry 102 to determine a location of an electrical fault. The location of an electrical fault may be determined based on a first rate of change of current measured by the first current sensor and/or a second rate of change of current measured by the second current sensor. For example, if the first rate of change of current measured by the first current sensor exceeds the fault threshold and the second rate of change of current measured by the second current sensor does not exceed the fault threshold, the location of an electrical fault may be determined to be between the first node and the switching circuitry (e.g. a shoot through fault). Similarly, if the first rate of change of current measured by the first current sensor does not exceed the fault threshold and the second rate of change of current measured by the second current sensor does exceed the fault threshold, the location of an electrical fault may be determined to be between the second node and the switching circuitry (e.g. fault in an external network to which the power conversion circuitry is connected).

In examples where the current sensors may generate fault signals when (an increase in or a decrease in) the measured rate of change of current exceeds the fault threshold, the fault signals may be sent to a master controller (or other health monitoring system) containing a look-up table which comprises predetermined patterns identifying fault location (s). This would be recorded and registered by the electrical system power controller. For internal converter faults, a decision to isolate and not re-connect may be made.

In examples where the power conversion circuitry 100 is a DC to DC converter, if the first current sensor is connected on a DC side of the power conversion circuitry 100 between a DC link capacitor and the switching circuitry 102 and the second current sensor is connected between the same DC link capacitor and a DC network, a difference in signals could be used to identify whether the fault is in the switching circuitry or DC network.

The control circuitry 110 is configured to detect an electrical fault based on the rate of change of current measured by the current sensor 108. The control circuitry 110 may be connected (e.g. electrically) to the current sensor 108 and the switching circuitry 102 such that the switching circuitry 102 may be controlled by the control circuitry 110 based on the rate of change of current measured by the current sensor 108. That is, if the control circuitry 110 identifies that the measured rate of change of current exceeds a fault threshold, the control circuitry 110 may determine that an electrical fault has occurred, and action should be taken. The fault threshold may be a maximum rate at which the measured current can increase and/or decrease without causing damage to the power conversion circuitry 100.

Action taken by the control circuitry 110 in response to determining an electrical fault comprises adjusting the current flow in the power conversion circuitry 100. For example, the current may be adjusted by creating an open circuit in the switching circuitry such that current no longer flows along the current path. Alternatively, the current may be adjusted by redirecting the current to an alternative current path to protect the switching circuitry from damage due to overcurrent.

The control circuitry 110 may receive a fault signal from the current sensor 108 when the control circuitry 110 determines the rate of change of current exceeds the fault threshold.

The fault threshold used by the control circuitry 110 to determine the presence of an electrical fault may be adjusted based on a magnitude of current measured by the current sensor 108. The fault threshold may be initially set to an initial fault threshold based on the maximum current rating for the power conversion circuitry. Adjusting the fault threshold may comprise increasing or decreasing the fault threshold compared to the initial fault threshold based on the measured magnitude of current flowing along the current path. For example, if the measured magnitude of current is measured to be below a safety rating for the power conversion circuitry, the fault threshold may be increased. Alternatively, if the magnitude of current is measured to be above the safety rating for the power conversion circuitry, the fault threshold may be decreased. The safety rating may be a certain percentage below the maximum current rating of the power conversion circuitry (e.g. 5%, 10%, 25%).

In addition to using a fault threshold to determine an electrical fault, the duration of a measured rate of change in current may be used to determine an electrical fault.

The power conversion circuitry 100 will now be described in more detail below with reference to FIG. 2.

Figure 2:
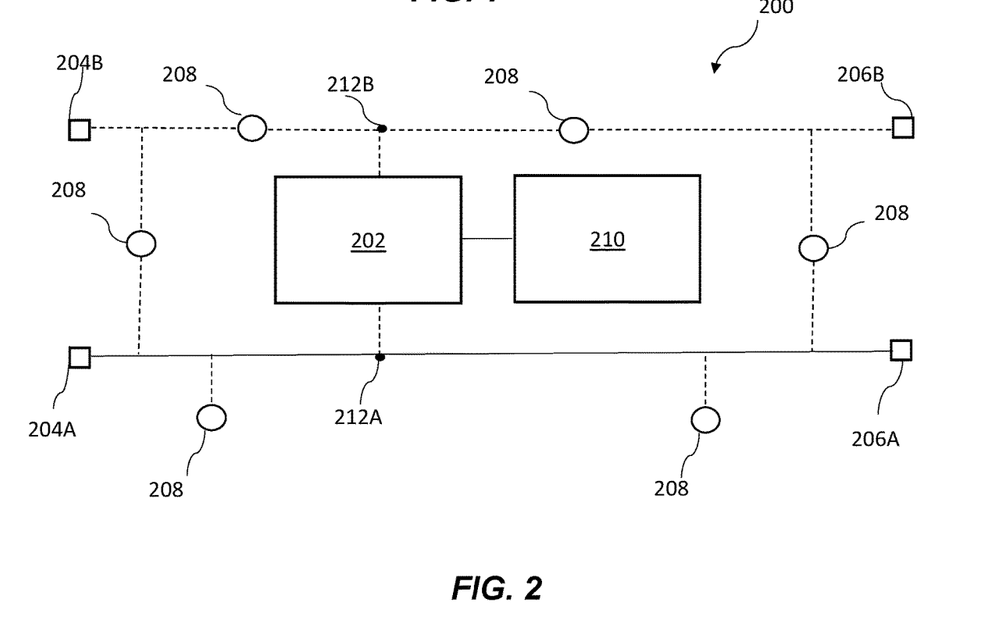
FIG. 2 is another schematic diagram of power conversion circuitry.

FIG. 2

Referring to FIG. 2, the power conversion circuitry 200 comprises switching circuitry 202 configured to control current flowing along at least one current path between a first and second nodes of the power conversion circuitry 200. A current sensor 208 is connected to the at least one current path. Control circuitry 210 is connected to the switching circuitry 202 and the current sensor 208.

The switching circuitry 202, current sensor 208 and control circuitry 220 of the power conversion circuitry 200 have at least the same functionality as the switching circuitry 101, current sensor 108 and control circuitry 110 discussed above in relation to the power conversion circuitry 100 of FIG. 1. Therefore, the descriptions of these functionality will not be repeated for brevity.

The switching circuitry 202 may comprise one or more transistors (e.g. MOSFETs, BJTs, IGBTs) configured to switch on and off (i.e. a conductive state and a non-conductive state) according to a predetermined switching pattern, for example using transistor driver circuitry. For BJTs, base driver circuitry may be used. For MOSFETS, gate driver circuitry may be used. Where the switching circuitry comprises plural transistors, those transistors may be configured to switch on and off at different times according to the predetermined switching pattern.

Additional circuit components (not shown) may be connected to the current path in series with or in parallel with the one or more transistors. For example, the switching circuitry 202 may comprise one or more capacitors, inductors and/or resistors connected in parallel with the one or more transistors between two points of the current path.

The power conversion circuitry 200 may comprise a configuration of transistors forming an H-bridge circuit. That is, the power conversion circuitry may be a H-bridge circuit comprising two or three pairs of transistors connected between the first and second nodes as two or three circuit legs.

In some examples, an electrical fault will (only) be determined by the control circuitry 210 if a rate of change of current measured by the current sensor 208 is determined to exceed the fault threshold for a predetermined time duration (e.g. a commutation period). The predetermined time duration may be related to the predetermined switching pattern. For example, the predetermined switching pattern may be a pulse width modulation (PWM) pattern according to which the one or more transistors are switched for a PWM period comprising a plurality of PWM cycles. The predetermined time duration may be greater than a duration of a PWM cycle (e.g. if the PWM cycle duration is 12.5 micro seconds, the predetermined time duration may be 13 micro seconds).

In some examples, an electrical fault will (only) be determined by the control circuitry 210 if a rate of change of the current measured by the current sensor 208 exceeds a first fault threshold for a first time duration, and/or a rate of change of the current measured by the current sensor 208 exceeds a second fault threshold for a second time duration, the second time duration being greater than the first time duration and the second fault threshold being less than the first fault threshold.

For example, if the rate of change of current measured by the current sensor 208 exceeds an upper threshold (i.e. first fault threshold), such as 250 Amperes, the current may be allowed to continue to flow for a minimum amount of time (i.e. the first time duration), such as 1 or 2 micro seconds. If the rate of change of current measured by the current sensor 208 only exceeds a lower threshold (i.e. the second fault threshold), such as 205 Amperes, without exceeding the upper threshold, the current may be allowed to continue to flow for a maximum amount of time (i.e. the second time duration), such as 10 or 20 micro seconds.

The control circuitry 210 may be configured to output a control signal for controlling operation of the transistor when an electrical fault is detected. The control signal may be output by the transistor driver circuitry in response to receiving a fault signal from the current sensor 208.

It will be understood that the current sensor 208 may be connected to the current path at a plurality of points of the power conversion circuitry 200, as discussed in more detail below.

In some examples, the first node may be a voltage supply comprising a first terminal 204A and a second terminal 204B (e.g. positive and negative supply terminals). The voltage supply may be, for example, a DC battery, a DC network or an AC network. The second node may be an output node comprising a first output terminal 206A and a second output terminal 206B (e.g. positive and negative output terminals). In such examples, currents flow between the terminals of the voltage supply and the output node along first and second branches of the current paths. The first current path branch may be taken to be the current path discussed above which flows between the first voltage supply terminal 204A and the first output node terminal 206A in the example of FIG. 2. The second current path branch is illustrated in FIG. 2 as a dashed line between the second voltage supply terminal 204B and the second output node terminal 206B. As illustrated in FIG. 2, the switching circuitry may be directly or indirectly connected to the first and second current paths via first and second switching circuitry terminals, 212A, 212B.

Examples of possible locations for the current sensor 208 are illustrated in FIG. 2. As illustrated, the current sensor 208 may be connected to the current path at at least one of the following positions:

the first current path branch at a position between the first voltage supply terminal 204A and the first switching circuitry terminal 212A;

the first current path branch at a position between the first voltage supply terminal 204A and the second switching circuitry terminal 212B;

the first current path branch at a position between the second voltage supply terminal 204B and the second switching circuitry terminal 212B;

the first current path branch at a position between the second voltage supply terminal 204B and the first switching circuitry terminal 212A;

the second current path branch at a position between the first output node terminal 206A and the first switching circuitry terminal 212A;

the second current path branch at a position between the first output node terminal 206A and the second switching circuitry terminal 212B;

the second current path branch at a position between the second output node terminal 206B and the second switching circuitry terminal 212B; and/or the second current path branch at a position between the second output node terminal 204B and the first switching circuitry terminal 212A.

The above example positions of the current sensor 208 include configurations in which the current sensor may be connected in series with the first node and the switching circuitry 202, in series with the switching circuitry 202 and the second node, or in parallel with the switching circuitry 202. Where the switching circuitry 202 comprises additional electronic components, the current sensor 208 may be connected in series with or in parallel with at least one of additional electronic components (e.g. capacitor, inductor and/or resistor).

It will be understood that the power conversion circuitry 200 may comprise plural current sensors 208 each having at least the same functionality as the current sensor 208 discussed above and the plurality of current sensors discussed above in relation to FIG. 1.

Following the detection of an electrical fault, the power conversion circuitry 200 may be configured to control the rate at which a transistor is switched to the off state in order to stop fault current flowing, as discussed in more detail below.

Under normal operating conditions (i.e. during conversion of AC/DC current), the transistors may be configured to switch between the on state and the off state at a first transition rate (i.e. the amount of time it takes to transition from the on state to the off state and from the off state to the on state). However, when a high fault current is flowing along the current path, the control circuitry 210 may configure a given transistor of the switching circuitry 202 to switch to the off state at a second transition rate which is less than the first transition rate. By transitioning at a reduced transition rate (i.e. transitioning from the on state to the off state over a greater amount of time compared to the first transition rate), a rapid rate of change in current through the transistor is avoided.

In examples where the transistor is a BJT, a control terminal of the transistor is a base terminal and the base terminal may be connected to a source node (e.g. high voltage or low voltage node, depending on the transistor conductivity type) via an impedance.

In examples where the transistor is a MOSFET, a control terminal of the transistor is a gate terminal and the gate terminal may be connected to a source node (e.g. high voltage or low voltage node, depending on the transistor conductivity type) via an impedance.

The impedance may be, for example, an internal resistance of another transistor. When the transistor of the other transistor is turned on, any charge at the gate terminal may dissipate to the source node through the other transistor having an internal resistance such that the transistor turns off at the second transition rate.

Figure 3:
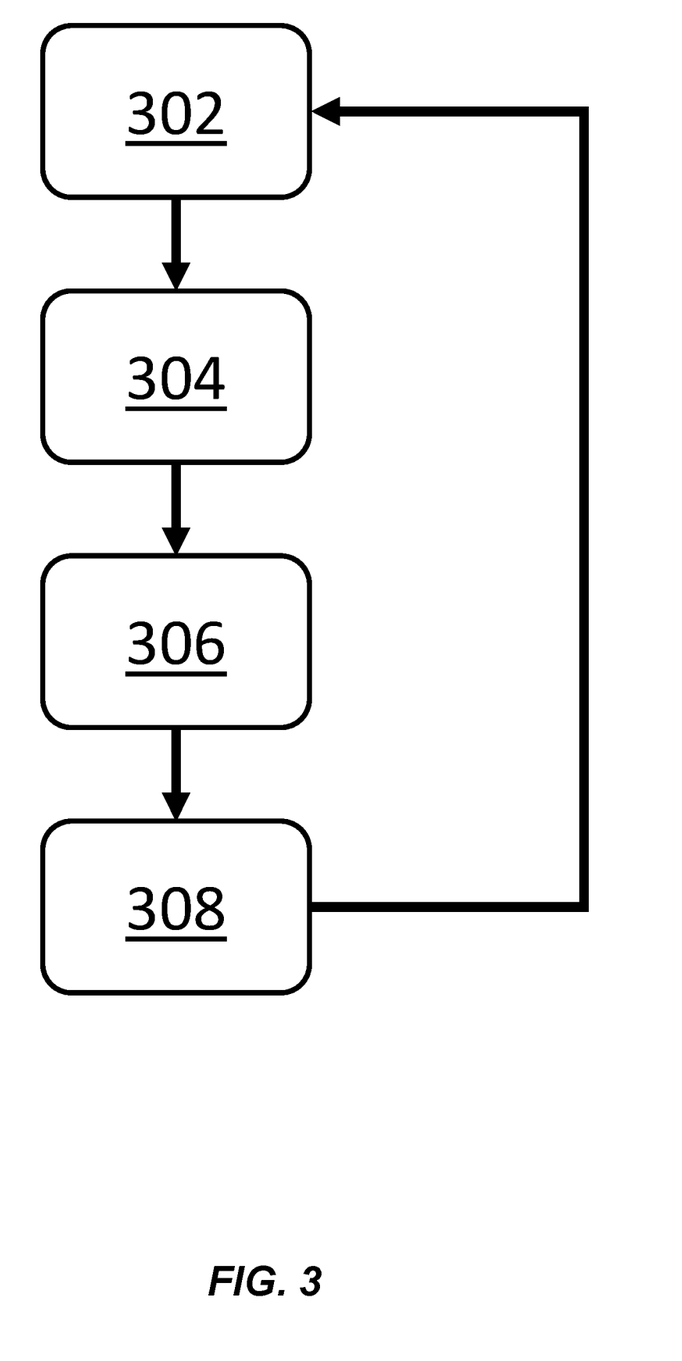
FIG. 3 is a schematic representation of a method of detecting an electrical fault in power conversion circuitry.

FIG. 3

An exemplary method 300 of detecting an electrical fault in the power conversion circuitry 100, 200 is shown in FIG. 3. The control method comprises:

302 controlling a current flowing along a current path between first and second nodes of the power conversion circuitry;

304 measuring a rate of change of the current flowing along the current path;

306 detecting an electrical fault if a rate of change of the current exceeds a fault threshold; and 308 adjusting current flow in the power conversion circuitry when an electrical fault is detected.

The control method 300 should be understood to control the power conversion circuitry 100, 200 to function as described above in relation to FIG. 1 and FIG. 2.

In any of the above examples, the various features may be implemented in hardware, or as software modules running on one or more processors/computers. For example, the method 300 may be implemented with a computer-readable medium comprising instructions which, when executed on a computer of power conversion circuitry, cause the computer to perform the method 300.

Examples also provide a computer program or a computer program product comprising instructions which, when executed by a computer, cause the computer to carry out any of the methods/method steps described herein, and a non-transitory computer-readable medium comprising instructions which, when executed by a computer, cause the computer to carry out any of the methods/method steps described herein. A computer program embodying the disclosure may be stored on a non-transitory computer-readable medium, or it could, for example, be in the form of a signal such as a downloadable data signal provided from an Internet website, or it could be in any other form.

Figure 4:
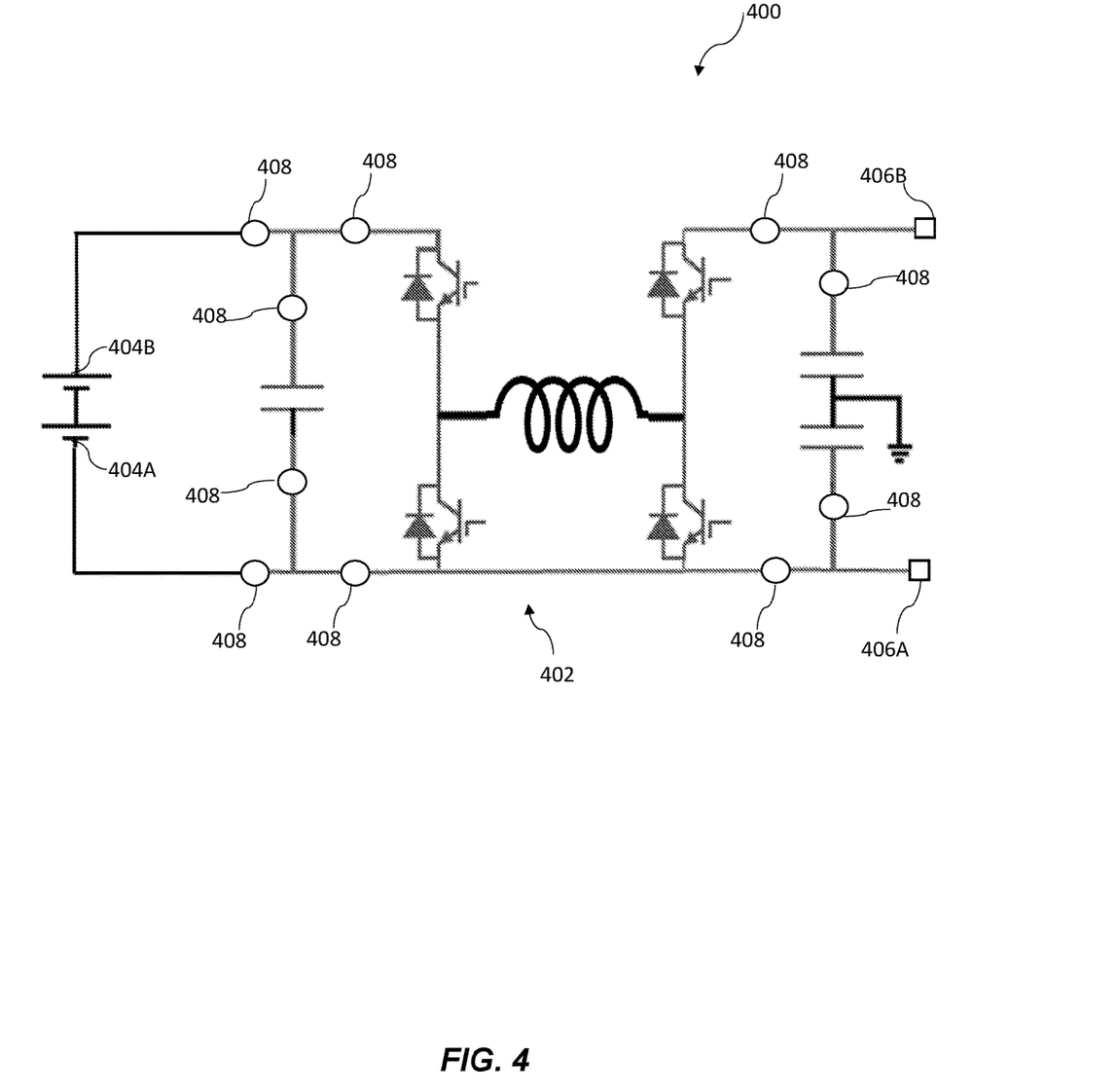
FIG. 4 is another schematic diagram of power conversion circuitry.

FIG. 4

In another example illustrated in FIG. 4, the power conversion circuitry is a H-bridge DC to DC converter (referred to from hereon as power converter circuitry 400). However, it will be understood that the power conversion circuitry 100 may be an alternatively configured DC to DC converted, an AC to DC converter, a DC to AC converter or a bidirectional AC to DC converter.

Referring to FIG. 4, power conversion circuitry 400 comprises switching circuitry 402 connected to a plurality of current paths, configured to control currents flowing along the plurality of current paths between first and second terminals of a voltage supply 404A, 404B and first and second terminals of an output node 406A, 406B. At least one current sensor 408 is connected to at least one of the current paths. Control circuitry 410 (not shown) is connected to the switching circuitry 402 and the current sensor 408.

The switching circuitry 402, at least one current sensor 408 and the control circuitry 410 have at least the same functionality as the switching circuitry 102, 202, current sensor 108, 208 and control circuitry 110, 210 described above, and therefore a description of these functionalities will be omitted for power conversion circuitry 400 for brevity.

The switching circuitry 402 comprises four anti-parallel transistor-diode pairs connected in a H-bridge arrangement. That is, first and second transistor-diode pairs are connected is series along a first leg, third and fourth transistor-diode pairs are connected in series along a second leg and an inductor is connected between the first and second legs between the upper and lower transistor-diode pair.

The switching circuitry further comprises capacitors connected in parallel with the switching circuitry. A first capacitor is connected to the first and second current paths between the first and second voltage supply terminals 404A, 404B. A second capacitor is connected to the first and second current paths between first and second output node terminals 406A, 406B. The second capacitor may be a pair of series connected capacitor having a ground terminal connected between them.

As with the power conversion circuitry 100, 200 discussed above, it will be understood that at least one current sensor 408 may be connected to the power conversion circuitry 400 at a plurality of positions/locations, as illustrated in FIG. 4. For example, at least one current sensor 408 may be connected to a current path:
  between either terminal of the voltage supply 404A, 404B and a first or second terminal of the switching circuitry (not shown);
  between either terminal of the output node 406A, 406B and either terminal of the switching circuitry;
  between two current path in a parallel connection with the switching circuitry 402 (e.g. in series with either capacitor); and/or
  between one of the capacitors and the switching circuitry 402.

In some examples, plural current sensors 408 may be connected to respective current paths to allow a location of an electrical fault to be identified and whether it is internal or external to the converter. For example, if a first rate of change of current is measured by a current sensor at the first or second terminal of the output node 406A, 406B and a second (lower) rate of change of current is measured by another current sensor at a position between the first or second voltage supply terminal 404A, 404B and first or second switching circuitry terminals 412A, 412B, this may indicate an external DC side pole-pole fault. An internal converter shoot-through event may be detected by a first rate of change of current at the first or second switching circuitry terminals 412A, 412B, a second (lower) rate of change of current at the first or second output terminals 406A, 406B (limited by the DC system impedance), and a third (lower) rate of change of current the first or second voltage supply terminals 204A, 204B (limited by the source impedance).

It can be seen that not only does the use of rate of change of current (i.e. di/dt) enable fast acting interruption at a lower current value, it also enables internal and external faults to be differentiated. The measurement of both absolute current magnitude and rate of change of current can both be used to determine the optimum time to operate protection (particularly if the pre-fault current is low).

In some examples, the inductor of the power conversion circuitry 400 may have an inductance of 40 micro Henrys, the voltage supply may supply a DC voltage of 540 Volts and a PWM cycle time may be 6.25 micro seconds for a 80 kilo Hertz PWM frequency. If a pre-existing current of 200 Amperes exists in the power conversion circuitry 400 at the instance a fault occurs, the rate of change of current would be 13.4 Amperes per micro second.

Under normal operation (i.e. DC to DC conversion without a fault condition), the inductor of the power conversion circuitry 400 is intentionally short circuited to a ground terminal. This short circuit generally last for a period less that a PWM cycle time. The short circuit is implemented by turning on the upper left hand side transistor and turning on the bottom right hand side transistor of the switching circuitry 402 to build up current in the inductor. However, this short circuit only persists for part of the PWM cycle time dictated by a duty cycle, and therefore does not remain for more than 12.5 us for an 80 kilo Hertz PWM frequency. Therefore, this short circuit state is less than 50% of the PWM cycle time (i.e. less than 6.25 micro seconds) to achieve DC voltage boosting between 100% and 200%.

In examples where the inductor is intentionally short circuited, as discussed above, a fault current may (only) be detected if at least one current sensor 408 measures a rate of change of current (i.e. increased di/dt) that exceeds the fault threshold for more than one PWM cycle (i.e. the predetermined time duration) to avoid inadvertently triggering fault protection during intentional short circuiting of the inductor (i.e. when the rate of change of current remains at 13.5 Amperes per micro second for more than 12.5 micro seconds).

Figure 5:
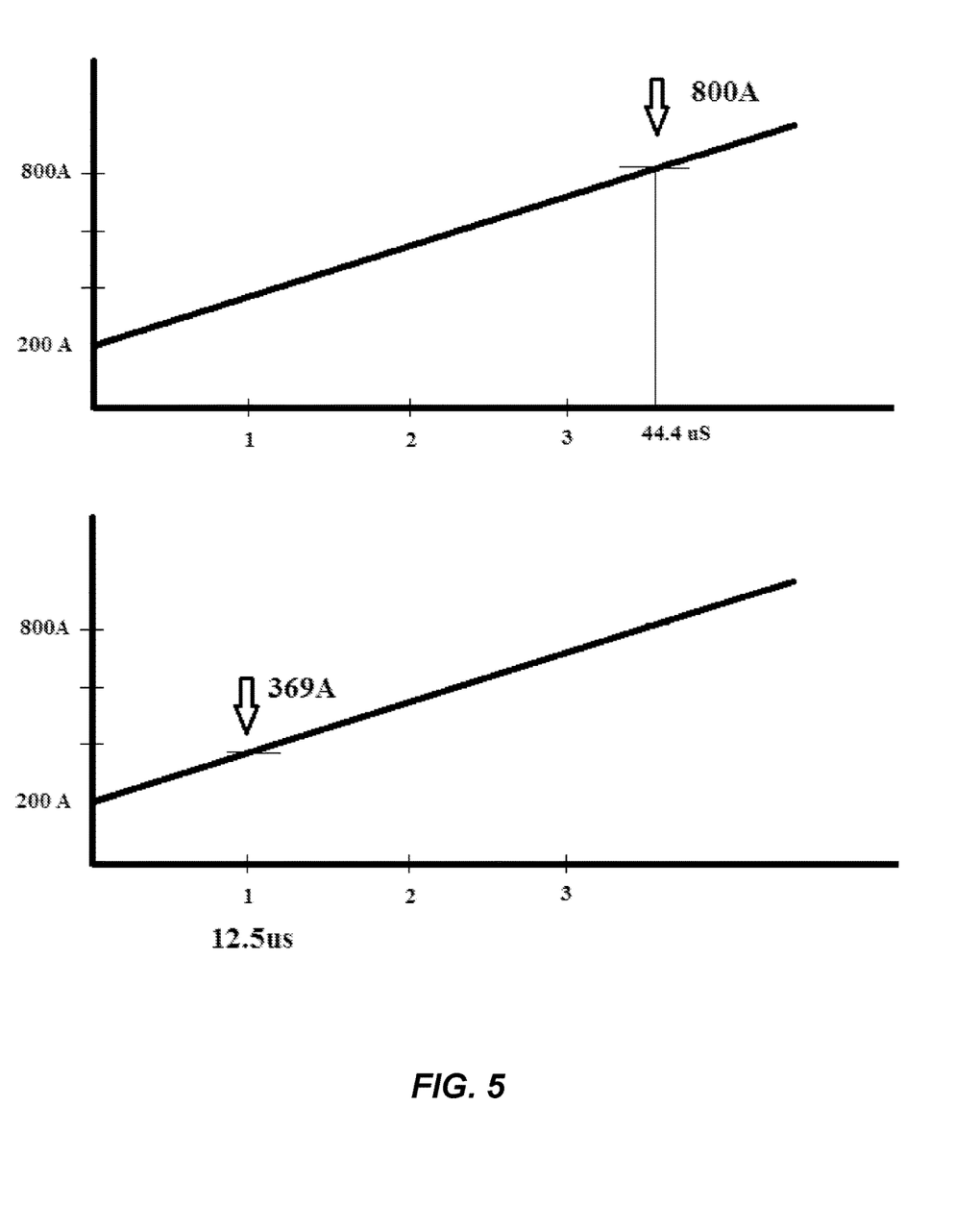
FIG. 5 shows graphs illustrating an existing technique of electrical fault detection compared to the power conversion circuitry.

FIG. 5

FIG. 5 shows two graphs illustrating a comparison of fault detection techniques. The top graph of FIG. 5 illustrates an existing fault detection technique (e.g. transistor desaturation). The bottom graph of FIG. 5 illustrates the above discussed technique of detecting a fault if an increased rate of change of current is measured for a predetermined time duration (i.e. greater than one PWM cycle). The x-axis of both graphs indicates number of PWM cycles and the y-axis of both graphs indicates current. As illustrated in FIG. 5, existing fault detection techniques allows fault current to reach 800 A within 3.5 PWM cycles (i.e. at 44.4 micro seconds).

It will be understood that power conversion circuitry 400 detects an electrical fault at a lower fault current compared to known techniques without affecting the operation of power conversion circuitry under normal operation. That is, a transistor protective turn-off command may occur after one PWM cycle has elapsed and still be at a level safe for the transistor. Furthermore, the current magnitude at which the turn-off command is initiated may be dependent on the initial pre-fault current. As such, configuring the at least one current sensor 408 to measure both a magnitude of current and a rate of change of current may enable the power conversion circuitry 400 to respond in a slower time if the initial pre-fault current were lower (e.g. 100 Amperes), thereby providing more time to respond to the fault. This may reduce the likelihood of incorrect tripping of the converter.

In order to protect the transistors from damage due to switching at high currents, the control circuitry 410 may be combined with soft-turn off of the transistor to reduce the transient voltage overshoot caused by a high rate of change of current in wiring and bus-bar inductance. The soft-turn off feature may slowly change the voltage between the gate and emitter (or gate and source) during the turn-off process to minimise this voltage over-shoot. As such, the power conversion circuitry 400 may interrupt fault current at a lower magnitude and minimise the associated inductive switching voltage transient.

An example electrical fault is an external fault which causes a DC network voltage (to which the power conversion circuitry 400 may be connected) to collapse to zero (or approximately zero). Such faults may be associated with a problem with a load connected to the DC network. In such examples, the inductor of the power conversion circuitry 400 may provide a means of slowing down the rate of change of current.

An example of an electrical fault which is internal to the power conversion circuitry 400 may be referred to as a "shoot through" fault (i.e. where a pair of upper and lower transistors of a given leg conduct at the same time). Such faults result is a rapid increase in rate of change of current. During a shoot-through fault, the rate of change of current and prospective peak current are both high as the impedance in the fault current paths is low. This involves both the discharge of the local DC capacitor and the discharge of the battery with both having low source resistance. Other stray resistance and inductance in wiring and bus-bars provides a small and almost insignificant contribution to the overall impedance.

The power conversion circuitry 400 may be used to detect such faults by measuring a rate of change of current and using this measurement to indicate the presence of a shoot-through event particularly as the rate of change of current is much higher than that seen in normal operation. For the example discussed above where the rate of change of current is 13.5 Amperes per micro second within each PWM timeframe as controlled by the circuit inductor, detection of higher magnitudes of rate of change of current (e.g. greater than 20 Amperes per micro second) would indicate an internal fault condition to which protective transistor turn-off could be initiated.

Furthermore, a high rate of change of current may be used to distinguish between an internal and external fault. Such information could be used by the system controllers and operators to determine whether it would be safe to attempt re-energisation of the DC electrical network once the fault has been cleared.

It will be understood that the disclosure is not limited to the examples above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. Power conversion circuitry configured to detect an electrical fault, the power conversion circuitry comprising:
   switching circuitry configured to control a current flowing along a current path between first and second nodes of the power conversion circuitry;
   a current sensor connected to the current path, the current sensor configured to measure a rate of change of the current flowing along the current path; and
   control circuitry connected to the current sensor and the switching circuitry,
   the control circuitry configured to:
      detect an electrical fault if a rate of change of the current measured by the current sensor exceeds a fault threshold, and
      configure the switching circuitry to adjust current flow in the power conversion circuitry when an electrical fault is detected and wherein
   the switching circuitry is configured to control currents flowing along a plurality of current paths between respective pairs of nodes of the power conversion circuitry comprising at least the first and second nodes;
   the power conversion circuitry comprises a plurality of current sensors comprising at least the current sensor, connected to the respective current paths, each current sensor configured to measure a rate of change of the current flowing along its current path;
   the control circuitry is connected between the plurality of current sensors and the switching circuitry, the control circuitry configured to:
      detect an electrical fault if a rate of change of the current measured by one or more of the current sensors exceeds a fault threshold, and
      configure the switching circuitry to control current flow in the power conversion circuitry when an electrical fault is detected.

2. The power conversion circuitry according to any claim 1, wherein:
   the current sensor is configured to measure a magnitude of the current flowing along the current path, and
   the control circuitry is configured to adjust the fault threshold based on the magnitude of current measured by the current sensor.

3. The power conversion circuitry according to claim 1, wherein:
   the switching circuitry comprises a transistor, and
   the control circuitry is configured to output a control signal for controlling operation of the transistor when an electrical fault is detected.

4. The power conversion circuitry according to claim 3, wherein:
   the transistor is configured to transition between a conductive state and a non-conductive state, and
   the control signal controls the transistor to remain in the non-conductive state when an electrical fault is detected.

5. The power conversion circuitry according to claim 1, wherein the current sensor is connected to the current path at a position:
   between the first node and the switching circuitry, or
   between the switching circuitry and the second node.

6. The power conversion circuitry according to claim 3, wherein:
   the first node is a voltage supply and the second node comprises first and second output terminals, and
   the current sensor is connected to the current path at a position between a first or second terminal of the switching circuitry and a first or second terminal of the voltage supply, or
   the current sensor is connected to the current path between the first or second terminal of the switching circuitry and the first or second output terminal.

7. The power conversion circuitry according to claim 1, wherein:
the plurality of current sensors comprise first and second current sensors connected to respective first and second current paths, wherein:
the first current sensor is connected to the respective current path at a position between the switching circuitry and the first node,
the second current sensor is connected to the respective current path at a position between the switching circuitry and the second node, and
the control circuitry is connected to the first current sensor, the second current sensor and the switching circuitry.

8. The power conversion circuitry according to claim 1, wherein
the first node is a voltage supply and the second node comprises first and second output terminals, and
the first current sensor is connected to the respective current path at a position between a first or second terminal of the switching circuitry and a first or second terminal of the voltage supply, and
the second current sensor is connected to the current path between the first or second terminal of the switching circuitry and the first or second output terminal.

9. The power conversion circuitry according to claim 7, wherein the control circuitry is configured to determine a location of an electrical fault based on a first rate of change of current measured by the first current sensor and/or a second rate of change of current measured by the second current sensor.

10. The power conversion circuitry according to claim 3, wherein:
the control circuitry configures the switching circuitry to control the current flowing along the current path when an electrical fault is not detected by configuring the transistor to switch between the conductive state and the non-conductive state at a first transition rate, and
the control circuitry configures the switching circuitry to adjust current flow in the power conversion circuitry when an electrical fault is detected by configuring the transistor to switch from the conductive state to the non-conductive state at a second transition rate, the second transition rate being less than the first transition rate.

11. The power conversion circuitry according to claim 10, wherein:
the transistor comprises a control terminal, and
the control circuitry configures the switching circuitry to switch the transistor from the conductive state to the non-conductive state at the second transition rate by connecting the control terminal to a source node via an impedance.

12. The power conversion circuitry according to claim 1, wherein the control circuitry is configured to detect an electrical fault if a rate of change of the current measured by the current sensor exceeds the fault threshold for a predetermined time duration.

13. The power conversion circuitry according to claim 12, wherein the predetermined time duration is a commutation period.

14. The power conversion circuitry according to claim 1, wherein the control circuitry is configured to detect an electrical fault if:
a rate of change of the current measured by the current sensor exceeds a first fault threshold for a first time duration, and/or
a rate of change of the current measured by the current sensor exceeds a second fault threshold for a second time duration, the second time duration being greater than the first time duration and the second fault threshold being less than the first fault threshold.

15. The power conversion circuitry according to claim 1, wherein the power conversion circuitry is an H-Bridge circuit.

16. The power conversion circuitry according to claim 1, wherein the switching circuitry is:
a bidirectional alternating current, AC, to direct current, DC, converter; or
a DC to DC converter.

17. A method of detecting an electrical fault in power conversion circuitry according to claim 1, the method comprising:
controlling a current flowing along a current path between first and second nodes of the power conversion circuitry;
measuring a rate of change of the current flowing along the current path;
detecting an electrical fault if a rate of change of the current exceeds a fault threshold; and
adjusting current flow in the power conversion circuitry when an electrical fault is detected.

18. A non-transitory computer-readable medium comprising instructions which, when executed on a computer of power conversion circuitry, cause the computer to perform the method of claim 17.

* * * * *